United States Patent [19]
Crabb, Jr.

[11] Patent Number: 5,281,071
[45] Date of Patent: Jan. 25, 1994

[54] PORTABLE ICE STORAGE AND DISPENSING SYSTEM

[75] Inventor: Richard V. Crabb, Jr., Pacific Grove, Calif.

[73] Assignee: Post-Harvest Technologies, Inc., Salinas, Calif.

[21] Appl. No.: 959,199

[22] Filed: Oct. 9, 1992

[51] Int. Cl.$^5$ .............................................. B65G 69/08
[52] U.S. Cl. .................... 414/310; 414/326; 222/412
[58] Field of Search ............... 222/404, 409, 412, 413, 222/252, 254, 233, 236; 414/310, 326

[56] References Cited

U.S. PATENT DOCUMENTS

| | | | |
|---|---|---|---|
| 3,212,652 | 10/1965 | Roberts | 414/310 |
| 4,294,176 | 10/1981 | Brooks | 414/542 X |
| 4,717,308 | 1/1988 | Kuhns | 414/310 X |
| 4,733,896 | 3/1988 | Klein | 414/10 X |

FOREIGN PATENT DOCUMENTS

| | | | |
|---|---|---|---|
| 2611681 | 9/1988 | France | 414/310 |
| 0213631 | 10/1985 | Japan | 414/310 |

Primary Examiner—Kevin P. Shaver
Attorney, Agent, or Firm—LaRiviere & Grubman

[57] ABSTRACT

A movable bulk storage bin for ice or other friable materials including a head rack base, tail rack base, drive end base, and discharge end base which fasten into pre-punched attachment holes to form a foundation frame. Corner posts mounted on the foundation frame are notched to receive a plurality of wall panels for containment of the material which is deposited via conveying means into the top of the bulk storage bin. Located within the foundation frame and parallel to the rack bases is a discharge conveyor which receives material such as ice from a traversing auger. A rack and pinion gear at each end of the traversing auger, in cooperation with carriages and drive motors, causes the traversing auger to rotate and to travel the length of the bin. The traversing auger is provided with opposite hand helical flighting having cutting teeth disposed thereon. As it travels the length of the bin while simultaneously rotating, the traversing auger undercuts the mass of material stored in the bin and conveys it into the discharge conveyor.

10 Claims, 8 Drawing Sheets

PORTABLE ICE STORAGE AND DISPENSING SYSTEM

BACKGROUND OF THE INVENTION

The present invention relates to preparing fresh food products such as fish or produce for shipment from the site of harvesting to market, and more particularly, to a method and apparatus for providing easily movable and quickly erectable portable large capacity bins for bulk storage and dispensing of ice or other similar materials.

It is important that the grower and the fisherman be able to quickly cool their product at the site of harvesting, namely, at the dock or in the field. Otherwise, poor quality food may be delivered to the consumer due to inability of the grower or fisherman to quickly cool his product to reduce pathological decay rates. Produce and seafood require large volumes of ice for cooling, but this requirement is seasonal. Because fixed ice plants are expensive, it is not practical to operate them for only two months out of the year. Hence, the growth of the agricultural and seafood business has been hindered because the grower or fisherman has been unable to quickly cool his product at the production site.

The trend in recent times is to provide portable icing systems which may be rapidly and safely moved from site to site to provide icing services thereby allowing for near annual use of the system and greatly reducing the cost when compared to under-utilized fixed ice plants. Currently, portable ice generators and portable ice application equipment are available and are used extensively. Ice storage, however, has largely been a problem in portable icing systems due to the large volumetric, structural, and cost requirements. As a result, ice has been stored by dumping it on a concrete pad, either in an exterior or interior location and manually shoveling it or using earth moving equipment, removing the ice from the pile and depositing it into conveyor means for transport to the ice application equipment. This method results in health, safety, and sanitation problems as well as wasted energy and water due to the high melt rate of uninsulated storage areas.

With the growing inability of electric utilities to meet peak demand loads, the storage component of a typical ice system takes on more importance by providing the ability to generate ice during "off-peak" periods and to utilize the inventory of ice from the storage during "on-peak" periods. This form of thermal energy storage can reduce on-peak electrical load to near 90%.

The automatic and sanitary handling of fragmentary ice in an ice storage bin has historically presented an exceedingly difficult problem. Fragmentary ice stored in a storage bin tends to fuse together and become difficult to move. As a result, fragmentary ice in bulk storage is difficult to handle because it is virtually incapable of flowing out of the bin by gravity. The inability of bulk fragmentary ice to flow by gravity has been recognized and the prior art has employed a device known as an ice rake to facilitate the handling of bulk ice. An ice rake is a type of drag conveyor which contacts the top of a pile of ice and is maintained in contact therewith by cables and weights.

Typically, ice rakes are positioned horizontally on an ice mass within the ice storage bin and serve to remove the fragmentary ice from the top of the pile to a discharge conveyor. Such systems have the disadvantage that they require considerable overhead clearance for the pulleys, cables, and motors required to maintain the ice rake in a horizontal position and to control the movement of the ice rake. In addition, such devices typically require a cumbersome counterweight movement mechanism in order to raise the ice rake to refill the bin with a new supply of fragmentary ice.

Various bin unloading systems have been proposed for materials other than fragmentary ice; however, many of them are inappropriate for use in the sanitary environment required for the storage and handling of ice. In particular, many of the conveying devices used for other materials have motors and gears located within the storage bin, which could lead to the introduction of grease or other impurities into the ice bin. Bin unloading systems such as these are therefore inappropriate for use in bulk ice storage bins.

Rakes often are raised and lowered by timing devices, and misjudgment of ice flow or ascent of rake frame can bury frames in ice. Thus, there is a need for a suitable mechanism for use in ice storage bins in order to provide efficient, sanitary unloading of fragmentary ice that has fused together. The present invention is directed toward filling that need.

DISCLOSURE OF INVENTION

The present invention relates to a low cost unitary ice bin and conveying structure. The storage structure disclosed herein is designed to make optimum use of a limited amount of space. Portable storage bins according to this invention are designed so that they may be prefabricated and assembled for use in the intended storage area. Manufacturing and assembly costs are therefore low. Further, the apparatus of the present invention is simple to operate and requires little maintenance. It is the purpose of this invention to provide a very fast set-up and knock-down system for short duration use, obtaining all of the advantages of safety, sanitation, energy conservation and reduction of water use while at the same time, reducing capital and operating costs to the user.

The present invention is an ice storage system which allows for quick assembly and disassembly, and which receives ice through the top. The ice storage system comprises a bin having a plurality of wall panels quick-fastened to corner posts, which are secured to a foundation frame. An ice mass within the bin is located over a traversing auger with opposite hand flighting which both traverses and rotates under the ice mass, cutting the ice and conveying the cut ice towards the center and into a discharge conveyor which then ejects the ice to the exterior of the bin. After a near full traverse, the ice mass falls, and the traversing direction is reversed cutting and conveying the ice into the discharge conveyor.

These and other objects and features of the invention will become more apparent when reference is made to the following detailed description of preferred embodiments and the drawings referred to therein.

BRIEF DESCRIPTION OF THE DRAWINGS

In the detailed description of the preferred embodiments of the invention hereinafter presented, reference is made to the accompanying drawings, in which.

Figure 1:
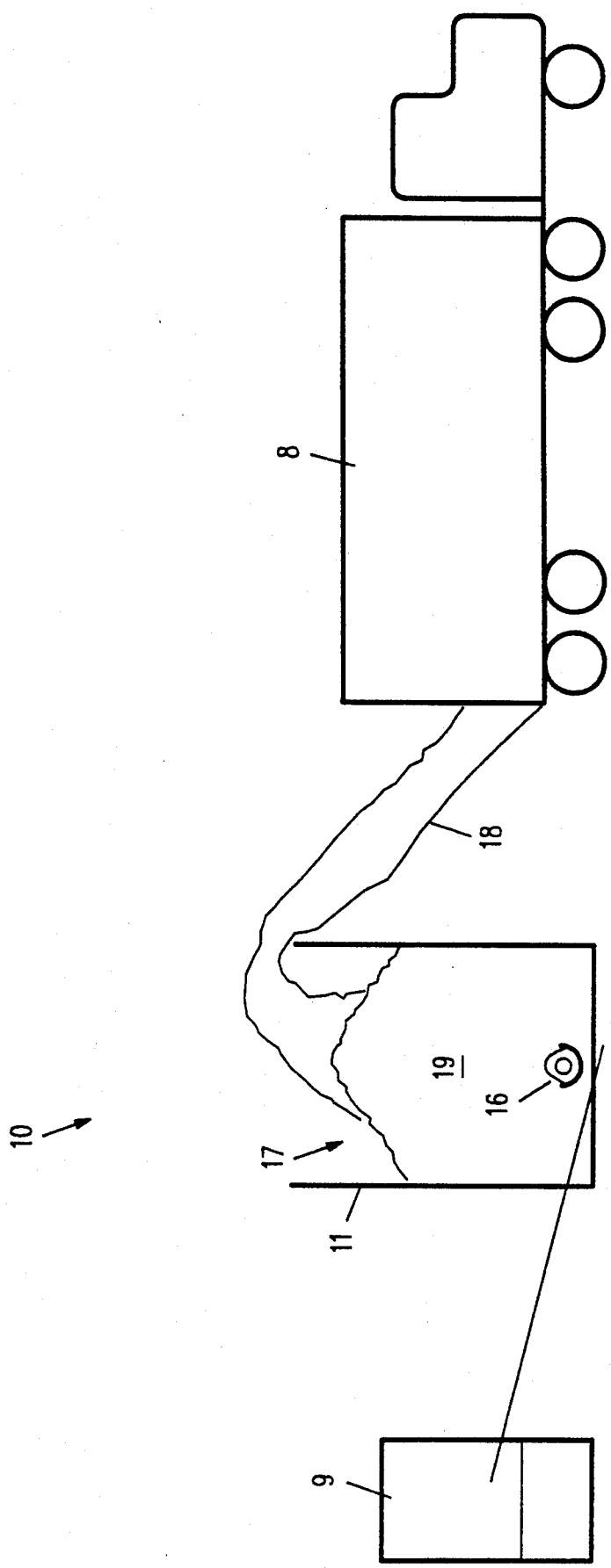
FIG. 1 is a pictorial diagram of an ice storage and dispensing system in accordance with the present invention.

Reference numbers refer to the same or equivalent parts of the invention throughout the several figures of the drawing.

DESCRIPTION OF THE PREFERRED EMBODIMENTS

Icing cartons of produce in the field normally takes place during a ten hour shift, basically during the daylight hours. A field of broccoli will fill 6,000 cartons in a ten hour shift which requires 12 tons of ice per hour. To produce that much ice during a 10 hour period requires a 288 ton/day ice plant. However, the ice generation capacity per hour can be reduced if the ice production is spread over 24 hours instead of over a 10 hour shift. Based on a 24 hour ice generating period, only a 120 ton/day ice generator is needed to ice 6,000 cartons of broccoli during a ten hour shift. This means that the ice generated over a 24 hour period needs to be stored for use during a ten hour shift.

Referring now to FIG. 1, a portable ice storage and dispensing system 10 is provided for temporary use in a produce field. The portable ice storage and dispensing system 10 is constructed for quick assembly and disassembly, and is a fast set-up and knock-down system for short duration use. The portable ice storage and dispensing system 10 comprises a storage bin 11 that is loaded with fragmented ice through the top 17 by conveying means 18 to form an ice mass 19. As will be explained hereinafter, ice is cut from the under side of the ice mass 19 and enters a discharge conveyor 16 which carries the ice to the exterior of the storage bin 11 and ejects it for use in icing cartons of produce. The top 17 may be open, if desired, or it may be covered with an insulated fabric having an ice entry port (not shown).

The ice that is loaded into the bin 11 may be generated in a portable ice generator 8 such as that discussed in U.S. Pat. No. 4,738,121. The ice discharged from the bin 11 may be conveyed to an injector 9 such as that disclosed in U.S. Pat. No. 4,484,448.

Figure 2:
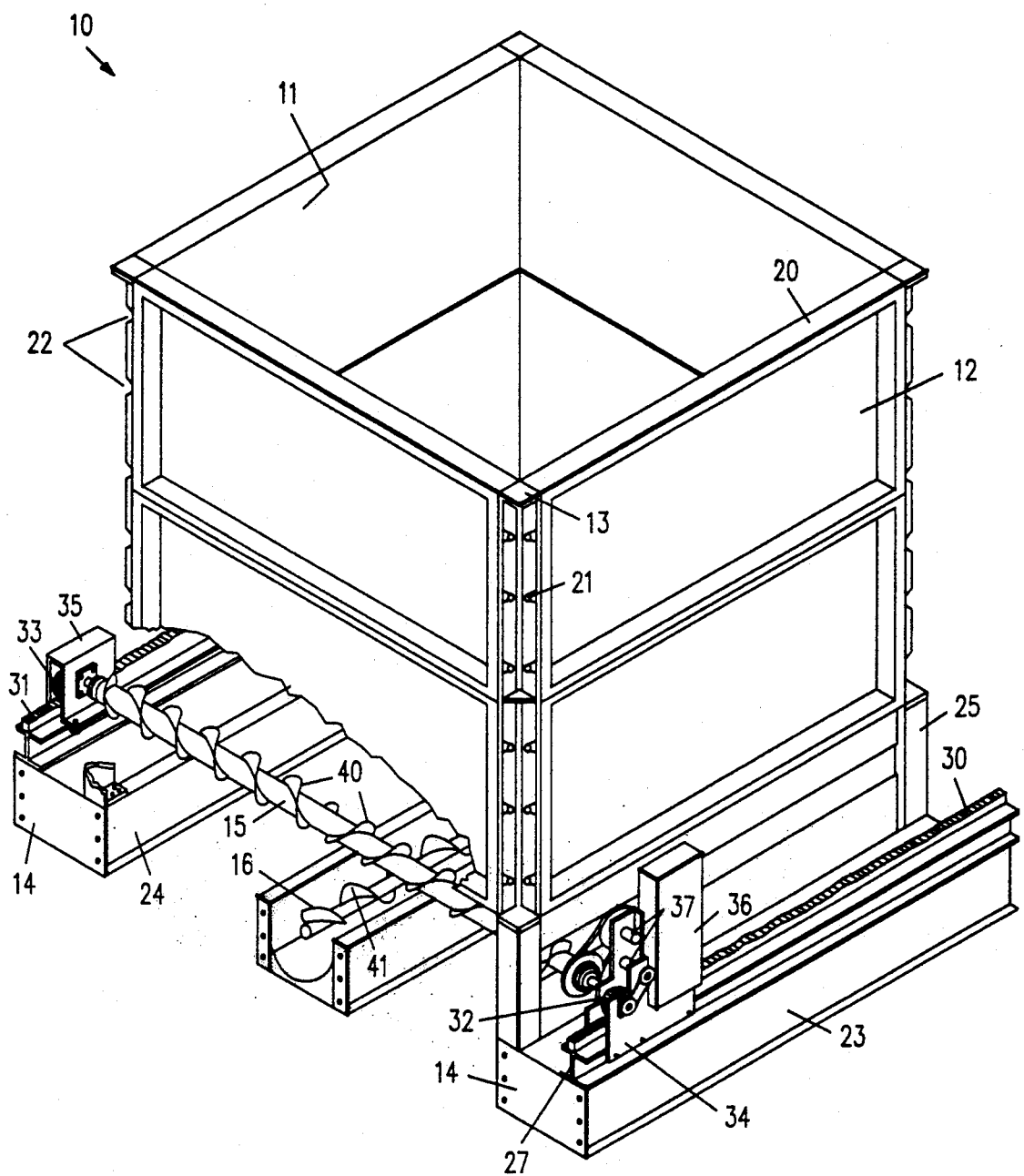
FIG. 2 is a perspective view, partly broken away, of an embodiment of a portable ice storage bin in accordance with the present invention.

Referring now to FIG. 2, the ice storage bin 11 is constructed of wall panels 12, quick-fastened to corner posts 13, which are secured to a foundation frame 14. At the bottom of the storage bin 11 is disposed a traversing auger 15 which both traverses and rotates under the ice mass 19 (FIG. 1). After a near full traverse, the ice mass 19 falls, and the traversing direction is reversed. The traversing auger 15 travels the length of the storage bin 11 in both directions while simultaneously rotating, thereby undercutting the ice mass 19. The cut ice is conveyed by the traversing auger 15 toward the center of the storage bin 11 and into the discharge conveyor 16 which carries the ice to the exterior of the storage bin 11 and ejects it.

Typically, the wall panels 12 may be made of metal or of 4×8 foot plywood panels, or the like, that present a smooth surface to the interior of the storage bin 11, while the corner posts 13 are made of metal. If plywood panels are used, they provide some thermal insulation for the ice. In either case, some additional thermal insulation such as polyurethane or the like may be attached. The wall panels 12 are mounted to rectangular frames 20 having quick-connect fasteners 21 that snap into notches 22 provided in the corner posts 13.

Figure 3:
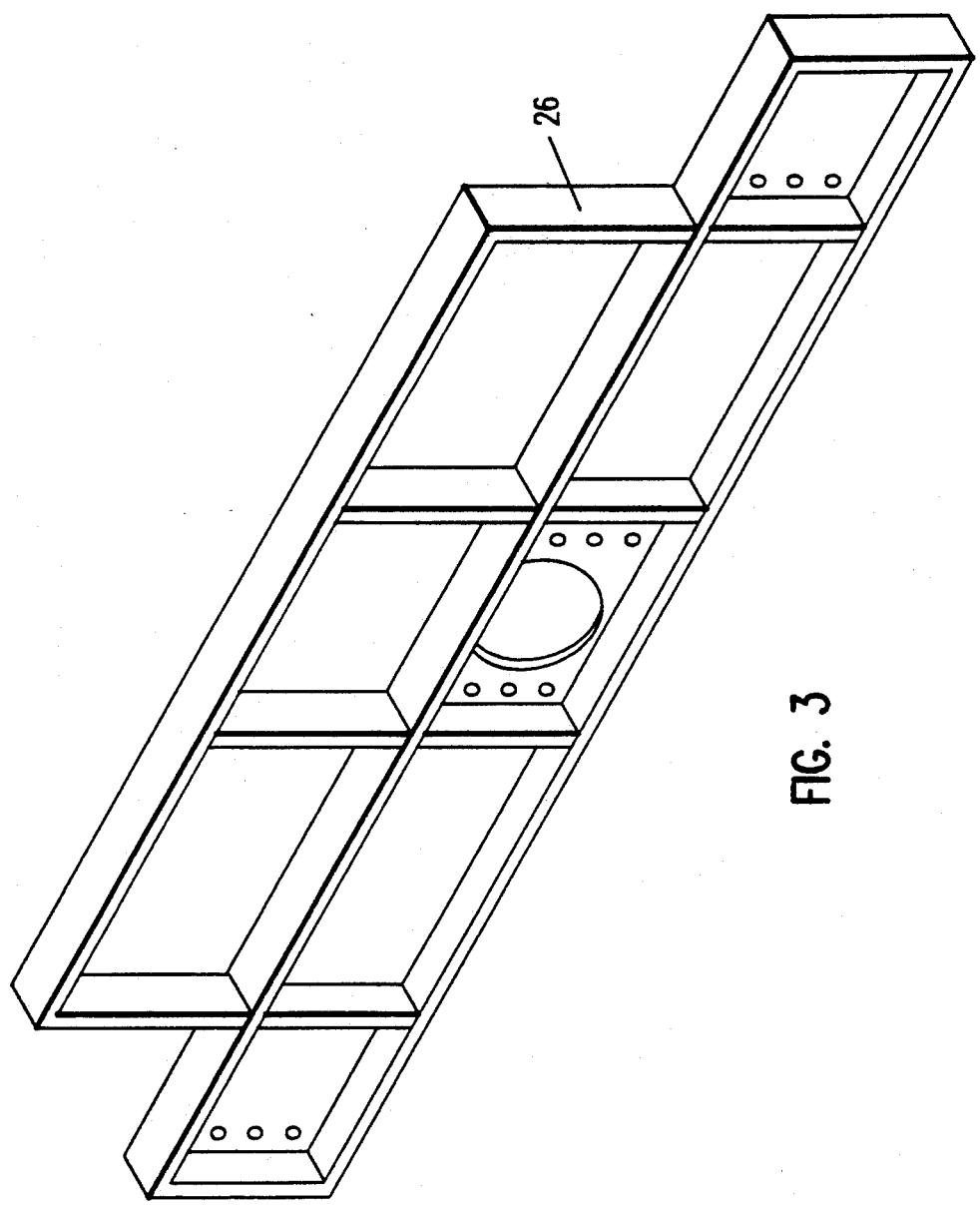
FIG. 3 is a perspective view of a discharge end base for the ice storage bin of FIG. 2.

The foundation frame 14 is made of a sturdy metal such as steel, and is provided with pre-punched attachment holes. The foundation frame 14 comprises a head rack base 23, and a tail rack base 24. These two portions of the foundation frame 14 carry the bulk of the load, and are formed using heavy steel I-beams, and the like. The corner posts 13 are fastened to the head rack base 23 and to the tail rack base 24. The foundation frame 14 also comprises a drive end base 25 and a discharge end base 26 (FIG. 3).

The head rack base 23 has mounted thereon an elongated, toothed head rack 30. The tail rack base 23 has mounted thereon a similar elongated toothed tail rack 31. The traversing auger 15 has a head gear 32 affixed to the head end thereof and engaged with the teeth of the head rack 30. Similarly, the tail end of the traversing auger 15 has a tail gear 33 affixed thereto and engaged with the teeth of the tail rack 31. The head end of the traversing auger 15 and the head gear 32 are mounted to a head carriage 34, while the tail end of the traversing auger 15 and the tail gear 33 are mounted to a tail carriage 35. The head carriage 34 is movably mounted for travel along the head rack base 23, and the tail carriage 35 is movably mounted for travel along the tail rack base 24. The head carriage 34 is provided with a drive mechanism 36 including motors 37 for rotating the traversing auger 15 and for causing the traversing auger 15 to travel the length of the storage bin 11 in both directions.

Figure 4:
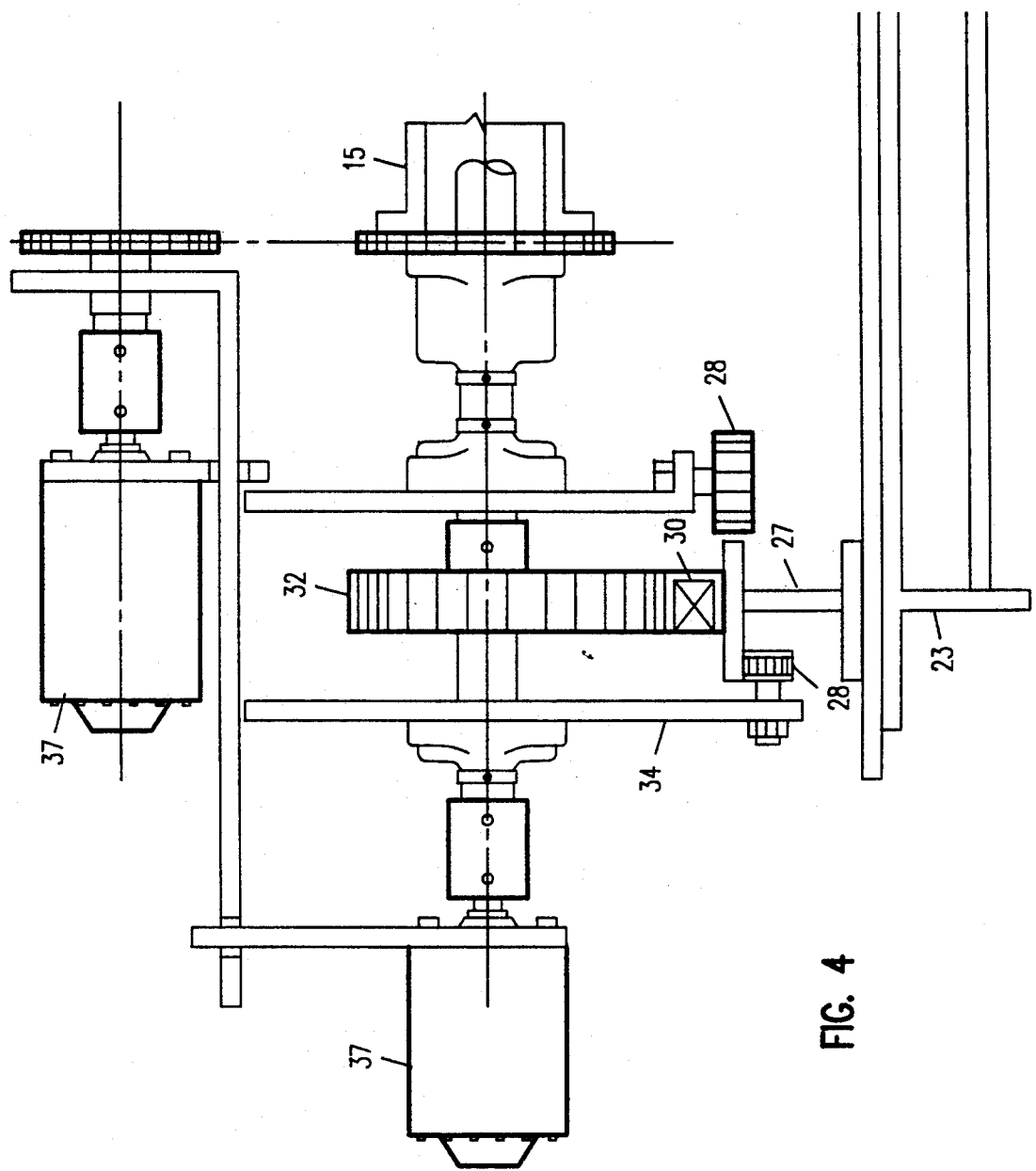
FIG. 4 is a fragmentary sectional side view showing a mounting detail for the head carriage of the ice storage bin of FIG. 2.

Referring now to FIG. 4, there is shown a detail drawing of the manner of movably mounting the head carriage 34 for travel along the head rack base 23. The head rack base 23 has affixed to it an I-beam 27 that supports the head rack 30. The head carriage 34 is provided with rollers 28 that roll along the I-beam 27 as the carriage 34 moves. It will be understood that the tail carriage 35 is similarly mounted. The upper motor 37 drives the chain that rotates the traversing auger 15, while the lower motor 37 drives the head gear 32 that causes the traversing auger 15 to travel the length of the head rack 30 in both directions.

Figure 5:
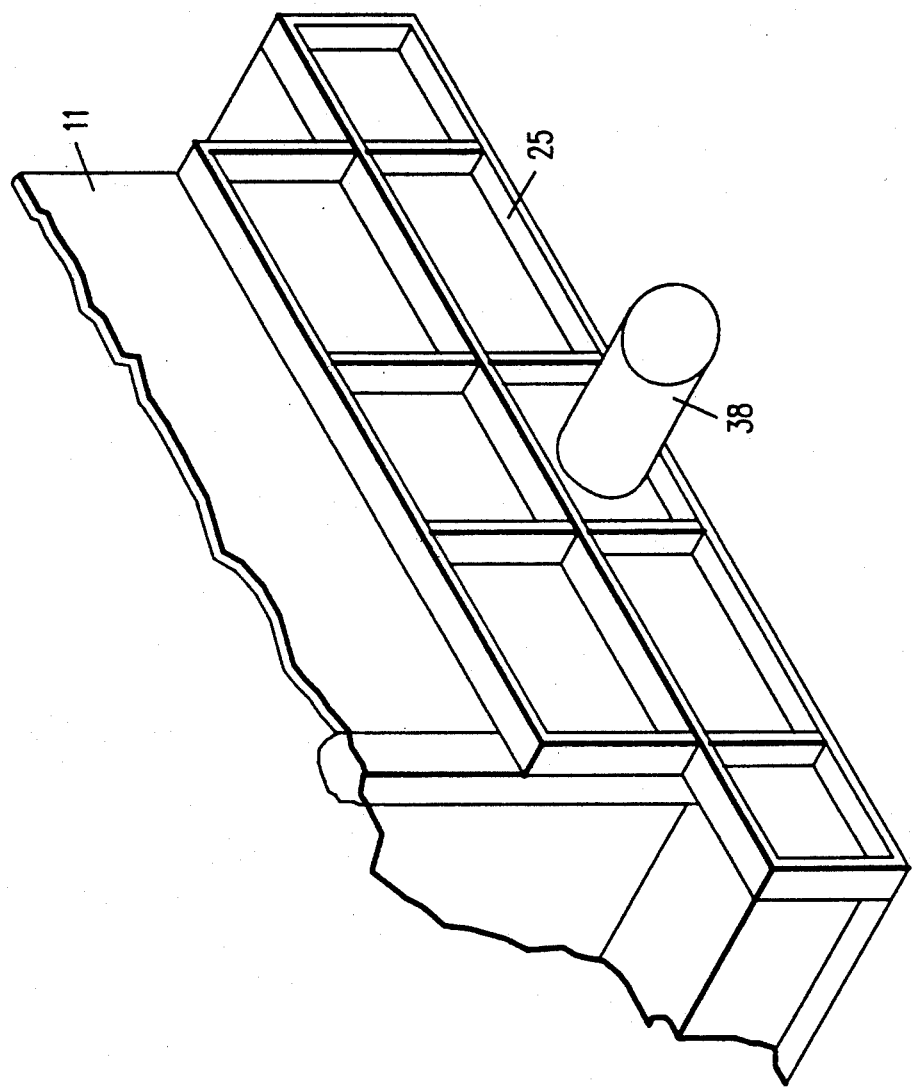
FIG. 5 is a perspective view of the drive end base of the ice storage bin of FIG. 2 showing the drive motor for the discharge conveyor.

The discharge conveyor 16 is provided with a drive motor 38 shown disposed on the drive end base 25 in FIG. 5. The traversing auger 15 is provided with opposite hand helical flighting 40 and cutting teeth (not shown) for undercutting the ice mass 19 within the storage bin 11. The helical flighting carries the cut ice toward the center to the discharge conveyor 16. It will be understood that opposite hand helical flighting means that on one side of the center, the helix is a left hand helix, and on the other side of the center, the helix is a right hand helix. This means that each side of the traversing auger 15 brings the cut ice to the center and deposits it in the discharge conveyor 16. The discharge conveyor 16 is provided with a simple conveyor helix 41 for conveying the cut ice to the exterior of the bin 11.

Figure 6:
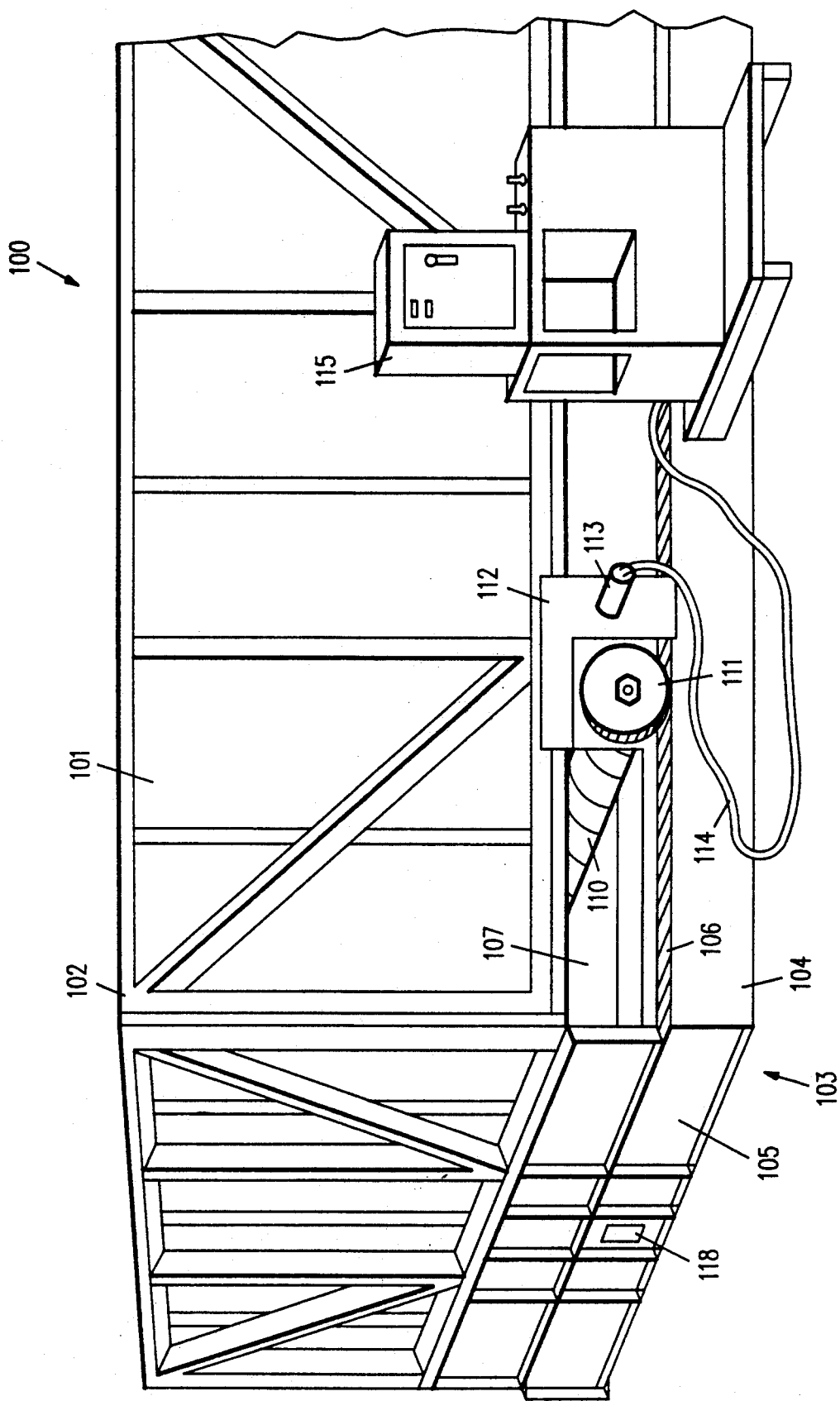
FIG. 6 is a perspective view of a second embodiment of a portable ice storage bin in accordance with the invention.

The embodiment of the invention shown in FIGS. 2-5 has two 8×24 foot wall panels on a side and, accordingly, provides a capacity of 8600 cubic feet which holds 160 tons of fragmented ice. It will be understood that other sizes may be built and used. Referring now to FIG. 6, there is shown a perspective view of a larger embodiment of a portable ice storage bin 100. As with the preceding embodiment, this bin 100 is loaded from the top and constructed for fast set-up and knock-down. It comprises wall panels 101, quick-fastened to corner posts 102, which are in turn secured to a foundation frame 103. The foundation frame 103 comprises a head rack base 104, a tail rack base (not seen in FIG. 6), a discharge end base 105, and a drive end base (not seen in FIG. 6). A discharge outlet 118 can be seen in the discharge end base 105.

The head rack base 104 is provided with an elongated toothed rack 106. The head rack base 104 is also provided with an elongated opening 107 extending parallel to the rack 106, the opening 107 leading into the interior of the bin 100. A traversing auger 110 may be seen through the opening 107 extending into the interior of the bin 100. The head end of the traversing auger 110 is affixed to a head gear 111 that is engaged with the rack 106. The head gear 111 is mounted on a head carriage 112 that is arranged for movement along the side of the bin 100. The head carriage 112 is provided with a drive motor 113 having a cable 114 extending to a control panel 115. The cable 114 is provided with an extra loop in order to permit the traversing auger 110 and the head carriage 112 to move back and forth along the length of the bin 100.

Figure 7:
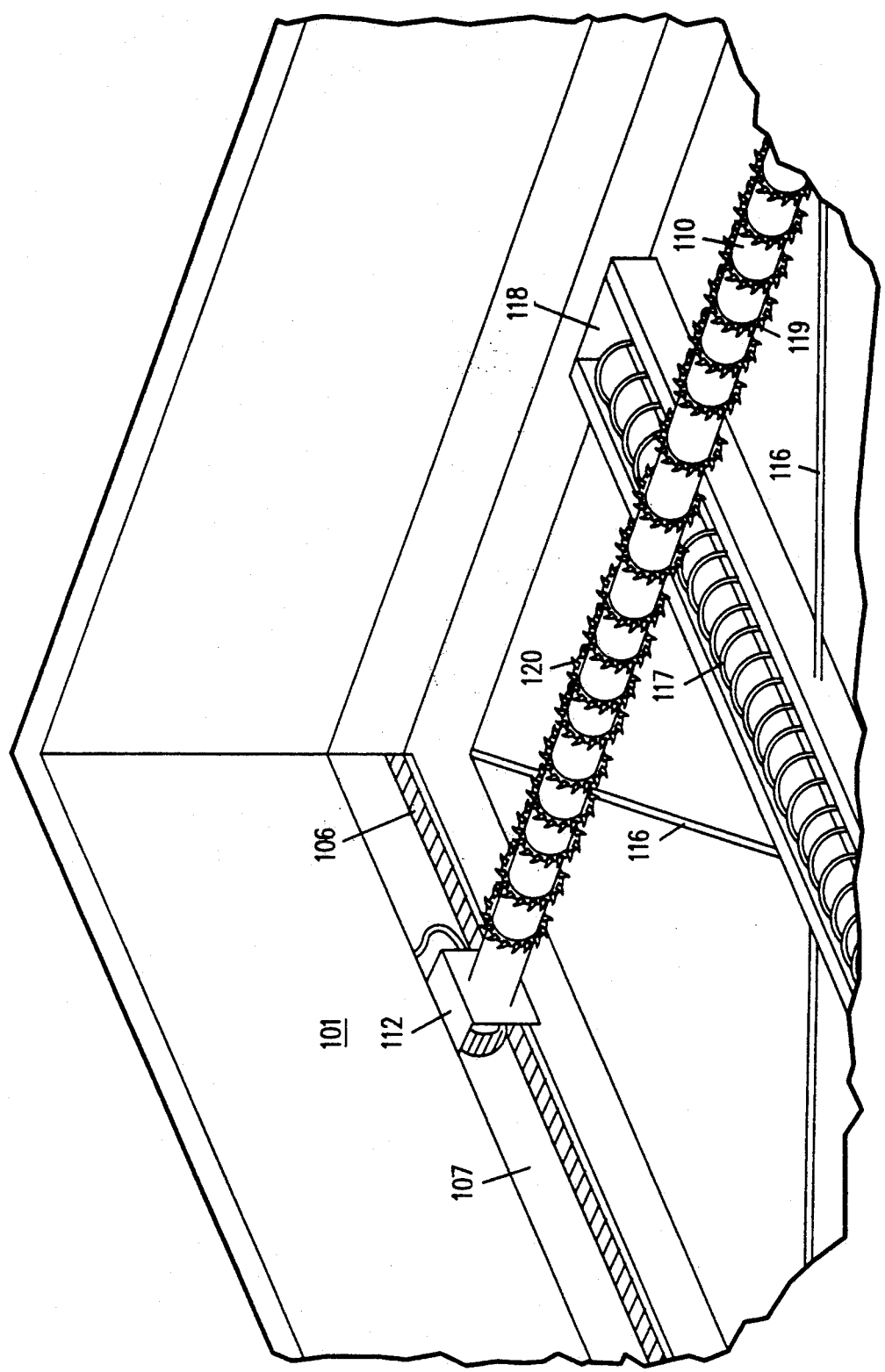
FIG. 7 is a perspective view within the bin of FIG. 6 showing the traversing auger and the discharge conveyor.
Figure 8:
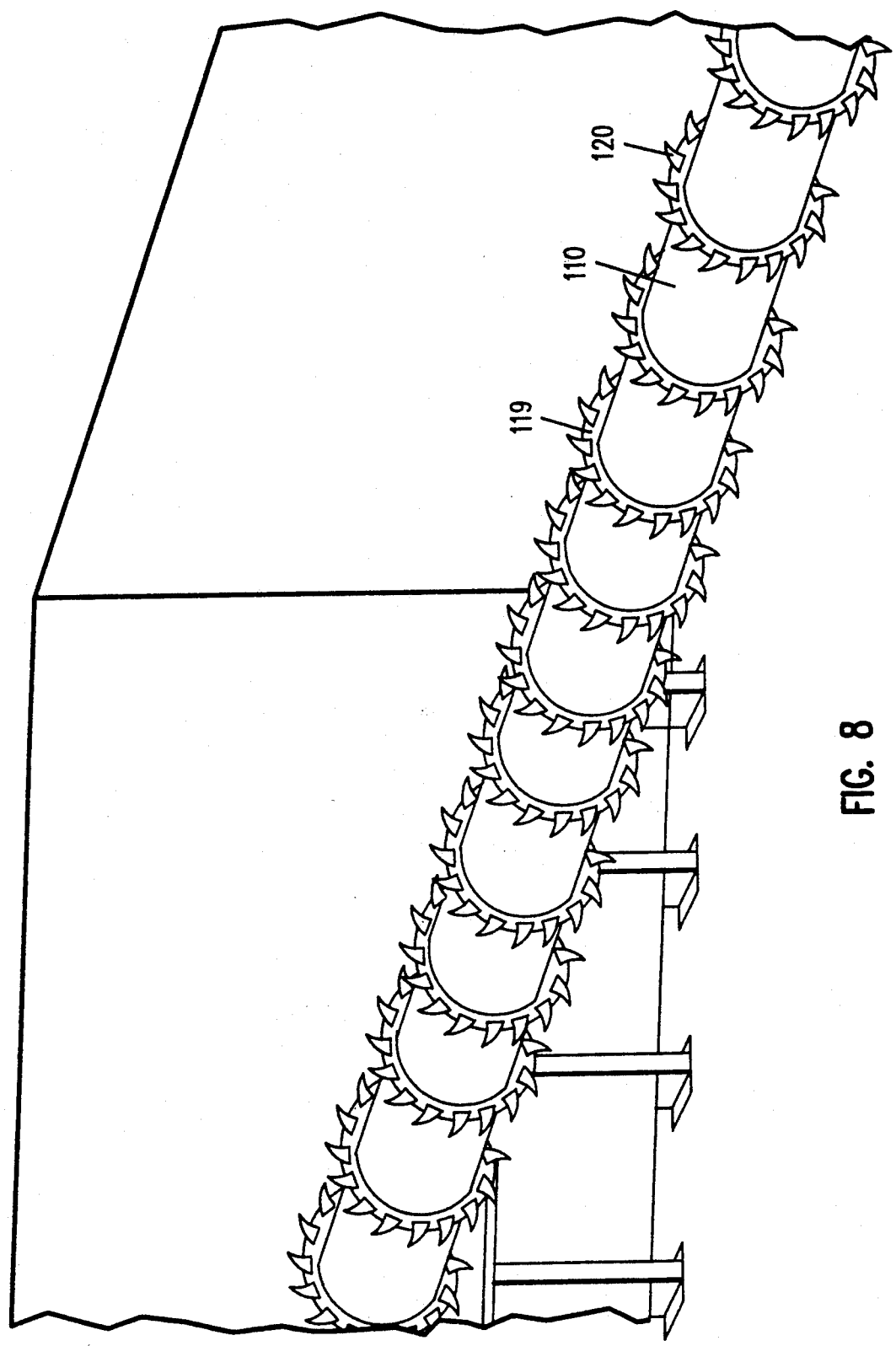
FIG. 8 is a perspective enlarged view of the traversing auger showing the opposite hand helical flighting and the cutting teeth disposed thereon.

FIG. 7 is a perspective view of the interior of the bin 100 looking toward the head carriage 112. The head carriage 112 and the rack 106 may be seen through the elongated opening 107. The interior of the wall panels 101 may be seen above the head rack base 104 and the discharge end base 105. Braces 116 are provided extending diagonally from corner to corner of the bin 100, and are tightened with turnbuckles (not shown). A discharge conveyor 117 may be seen extending toward the discharge outlet 118 in the discharge end base 105. In FIG. 7 it may be seen that the traversing auger 110 has opposite hand helical flighting 119 and cutting teeth 120. FIG. 8 is a perspective view of the traversing auger 110. In this view, the helical flighting 119 and the cutting teeth 120 may be more clearly seen.

Thus, there has been described a novel ice storage bin which allows for quick assembly and disassembly. The present invention employs a traversing auger with opposite hand flighting which both traverses and rotates under an ice mass within a bin, thereby cutting the ice and conveying the cut ice toward the center and into a discharge conveyor which then ejects the ice to the exterior of the bin. After a near full traverse, the ice mass falls, and the traversing direction is reversed. The ice storage bin of the present invention provides efficient, sanitary unloading of fragmentary ice that has fused together. It is suitable for use at the site of harvesting, is easily movable and quickly erectable.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

What is claimed is:

1. A storage and dispensing system for storing a matter which may form into at least one mass with storage and for dispensing the matter after storing, comprising in operative combination:
    a containment having a determined length and an inner wall, the length having a first and a second end point;
    an auger disposed within the inner wall of the containment, the auger having a rotatable shaft and a rotatable cylindrical casing, the casing having a helical flange affixed to and rotatable with the casing, the helical flange having cutting teeth affixed thereto;
    a drive means located external to the inner wall and coupled to the auger for causing the auger to rotate to travel substantially the length of the containment and to cut away the matter from the mass; and
    a discharge conveyor disposed within the inner wall for removing the matter cut away from the mass from the containment.

2. The system of claim 1 wherein the drive means rotates the auger for a first direction of travel from the first end point toward the second end point, and then rotates the auger for a second direction of travel from the second end point toward the first end point.

3. The system of claim 2 wherein the containment is a storage bin including a head rack base and a tail rack base.

4. The system of claim 3 wherein the helical flange is opposingly pitched on opposite sides of the casing for directing the matter cut away to the discharge conveyor from opposing halves of the storage bin, the auger being disposed substantially perpendicular to the discharge conveyor, the discharge conveyor being disposed substantially parallel to the head rack base and to the tail rack base.

5. The system of claim 4 wherein the cutting teeth are disposed at an angle defined by the flange and the casing.

6. The system of claim 5 further comprising an elongated toothed head rack and an elongated toothed tail rack external to the inner wall, the head rack affixed to the head rack base, the tail rack affixed to the tail rack base.

7. The system of claim 6 wherein the auger includes a head gear and a tail gear external to the inner wall, the head gear disposed at one end of the shaft, the tail gear disposed at an end opposite the one end, the head gear and the tail gear for engaging the head rack and the tail rack respectively.

8. The system of claim 7 wherein the storage bin includes a foundation frame, corner posts and walls, the foundation frame including the head rack base and the tail rack base, the corner posts having quick attachment fasteners using a pin and slot type of arrangement, the walls including a plurality of wall panels having pin type fasteners for attachment to the quick attachment fasteners of the corner posts.

9. A portable storage and dispensing system for temporary use, the portable storage and dispensing system being characterized in that it facilitates the removal of stored material that does not flow out by gravity, and being characterized in that it allows for quick assembly and disassembly, said portable storage and dispensing system comprising:

- a storage bin including a foundation frame, corner posts, and walls;
- said foundation frame including a head rack base, a tail rack base, a drive end base, and a discharge end base, said foundation frame assembled by means of pre-punched attachment holes;
- said corner posts being attachable to said foundation frame, said corner posts having quick attachment fasteners;
- said walls including a plurality of wall panels having fasteners that attach to said quick attachment fasteners in said corner posts;
- a discharge conveyor disposed within said storage bin parallel to said rack bases for receiving stored material and carrying it to a discharge outlet located in said discharge end base;
- an elongated toothed head rack affixed to said head rack base;
- an elongated toothed tail rack affixed to said tail rack base;
- a traversing auger having a head gear at one end engaged with said head rack;
- said traversing auger having a tail gear at the other end engaged with said tail gear;
- said traversing auger having opposite hand helical flighting and cutting teeth affixed to said helical flighting and disposed within said storage bin; and
- drive means coupled to said traversing auger for causing said traversing auger to travel substantially the length of said storage bin in a first direction and to travel substantially the length of said storage bin in a second direction opposite said first direction while simultaneously rotating, the drive means disposed external to said storage bin;
- said traversing auger undercutting stored material that has fused together, said traversing auger conveying the cut material toward the center of said storage bin to said discharge conveyor for discharge from said storage bin.

10. A portable ice storage and dispensing system for temporary use in a produce field, the portable ice storage and dispensing system being characterized in that it facilitates the removal of fragmentary ice that has fused together, and being characterized in that it allows for quick assembly and disassembly, said portable ice storage and dispensing system comprising:

- a storage bin including a foundation frame, corner posts, and walls;
- said foundation frame including a head rack base, a tail rack base, a drive end base, and a discharge end base, said foundation frame assembled by means of pre-punched attachment holes;
- said corner posts being attachable to said foundation frame, said corner posts having quick attachment fasteners;
- said walls including a plurality of wall panels having fasteners that attach to said quick attachment fasteners in said corner posts;
- a discharge conveyor disposed within said storage bin parallel to said rack bases for receiving fragmentary ice and carrying it to a discharge outlet located in said discharge end base;
- an elongated toothed head rack affixed to said head rack base;
- an elongated toothed tail rack affixed to said tail rack base;
- a traversing auger having a head gear at one end engaged with said head rack;
- said traversing auger having a tail gear at the other end engaged with said tail gear;
- said traversing auger having opposite hand helical flighting and cutting teeth affixed to said helical flighting and disposed within said storage bin; and
- drive means coupled to said traversing auger for causing said traversing auger to travel the length of said storage bin in a first direction and to travel the length of said storage bin in a second direction opposite said first direction while simultaneously rotating, the drive means disposed external to said storage bin;
- said traversing auger undercutting said fragmentary ice that has fused together, said traversing auger conveying the cut ice toward the center of said storage bin to said discharge conveyor for discharge from said storage bin.

* * * * *